3,268,540
CERTAIN INDOLIZINE DERIVATIVES
Richard J. Mohrbacher, Fort Washington, Pa., assignor to McNeil Laboratories, Inc., a corporation of Pennsylvania
No Drawing. Filed June 14, 1965, Ser. No. 463,909
11 Claims. (Cl. 260—294)

This application is a continuation-in-part of my application, Serial No. 269,880, filed April 2, 1963, now pending.

This invention relates to a new series of organic compounds. More particularly, this invention relates to certain amides and amino esters of octahydro-3-oxo-indolizines and to methods for their preparation.

The compounds of the present invention may be represented by the following structural formula:

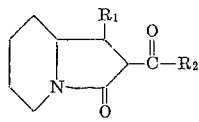

wherein $R_1$ is a member selected from the group consisting of hydrogen and phenyl and —$R_2$ stands for —O—Alk—N(Alk)$_2$, —O—X—Alk, —X—Ar,
—NH—Alk—N(Alk)$_2$, —NH—Alk—Ar,
—NH—Alk—X, —X, and —X—Alk—OH Alk represents a lower alkyl group, straight or branched-chain; containing from 1 to 7 carbon atoms; O stands for oxygen; N stands for nitrogen; X is an azacycloalkyl or oxa-azacycloalkyl group containing from 4 to 5 carbon atoms such as pyridyl, piperidyl, piperazinyl, pyrrolidinyl or morpholinyl; Alk—OH stands for hydroxyalkyl containing from 1 to 7 carbon atoms and Ar is a monocyclic unsaturated radical such as phenyl or substituted phenyl. Examples of such groups include dialkylaminoalkyloxy; alkylpiperidyloxy; arylpiperazinyl such as 4-phenyl-1-piperazinyl; dialkylaminoalkylamino; aralkylamino such as benzylamino, phenethylamino and α-methylphenethylamino; pyridylalkylamino, piperidylalkylamino, pyrrolidinylalkylamino and piperazinylalkylamino; hydroxyalkylamino, hydroxyalkylpiperazinyl, hyroxylalkylpyrrolidinyl and hydroxyalkylpiperidyl.

The compounds of the present invention, in tests on animals, have been found to possess hypotensive properties. For example, 4 and 8 mg./kg. of body weight doses of (1-methyl-4-piperidyl) octahydro-3-oxo-1-phenyl-2-indolizinecarboxylate when administered intravenously to a dog product transient hypotension and a 16 mg./kg. dose produces marked prolonged hypotension.

The compounds of the present invention cause a decrease in motor activity when tested on animals and are therefore useful as central nervous system depressants. Many of the novel compounds show anti-inflammatory activity when tested on mice and rats.

The specific therapeutic usefulness of the novel compounds depends, to a large extent, on their exact chemical constitution and configuration. For example, the 1-phenyl substituted compounds and the basic esters exhibit more pronounced hypotensive properties whereas those bearing a 2-(arylpiperazinyl) group exhibit anti-inflammatory activity.

The novel indolizines are prepared by Knoevenagel condensation of 2-pyridinecarboxaldehyde with a dialkyl malonate. A suitable basic condensing agent for this reaction is a secondary amine such as dibutylamine or piperidine. Advantageously, one may conduct the reaction in the presence of a weak organic acid such as acetic, formic, propionic, butyric or, preferably, benzoic acid.

The resultant dialkyl 2-pyridylmethylenemalonate is then hydrogenated by reacting it with hydrogen catalytically activated by a platinum, palladium or nickel catalyst such as platinum oxide or Raney nickel. The intermediate piperidinomethylmalonate cyclizes to the octahydroindolizine ester, which is then reacted, if desired, with a benzyl halide in the presence of a metal hydride such as sodium hydride to give the corresponding 2-benzyl-2-indolizinecarboxylate. The latter may be saponified in the presence of a basic catalyst such as an alkali or alkaline earth metal carbonate, oxide or hydroxide as, for example, potassium hydroxide or, preferably, sodium hydroxide to produce the corresponding octahydro-3-oxo-indolizine carboxylic acid. Such acid, and the corresponding acid halide, may be ring closed. In the case of the free acid, catalytic cyclodehydration with an inorganic acid such as polyphosphoric acid or hydrofluoric acid effects closure. In the case of the acid halide, treatment with an aluminum halide such as aluminum chloride causes cyclization. In both cases a hexahydro-oxospiro-indanindolizine is obtained. The latter may be reduced with complex metal hydrides such as the metal borohydrides or lithium aluminum hydride to give various hexahydro- and oxtahydro-hydroxy-spiro indanindolizines. Such compounds, of which 1',5',6',7',8',8a'-hexahydro-1-oxospiro(indan-2,2'-indolizine)-3'-(2'H)-one is an example, show hypotensive and anti-inflammatory properties in experimental animals.

If it is desired that the octahydro-oxo-indolizinecarboxylic acid be phenyl substituted, the dialkyl 2-pyridyl-methylenemalonate is reacted with a Grignard reagent such as a phenylmagnesium halide in an ethereal solvent. This gives the phenyl substituted malonate which is then catalytically hydrogenated as described above to give the 1-phenyl substituted ester of octahydro-oxo-indolizine which may be converted to the corresponding 2-carboxylic acid by saponification, i.e., treatment with a base such as potassium hydroxide or sodium hydroxide. An example of such ester as methyl octahydro-3-oxo-1-phenyl-2-indolizinecarboxylate. An example of such acid is octahydro-3-oxo-1-phenyl-2-indolizinecarboxylic acid. These compounds decrease mean blood pressure and motor activity in animals, hence are useful as hypotensives and central nervous system depressants.

The novel basic esters are obtained by converting the octahydro-3-oxo-indolizinecarboxylic acid, prepared as described above, to the corresponding acid halide, mixed anhydride or alkyl ester forms followed by condensation with the appropriate tertiary aminoalcohol. The reaction leading to the final product may be conducted in the presence of a suitable organic reaction solvent such as toluene, xylene, hexane, heptane, tetrahydrofuran or, preferably, benzene. Alternatively, if the intermediate acid halide, mixed anhydride or alkyl ester is condensed with the appropriate amine having a replaceable hydrogen, the corresponding amide is obtained.

Therapeutically useful acid addition salts of the compounds of this invention include those obtainable by reacting the base with an appropriate acid, as for example, an inorganic acid such as hydrochloric, thiocyanic, sulfuric or phosphoric acid, or an organic acid such as acetic, lactic, oxalic, malonic, fumaric, benzoic, etc. The fumarate and hydrochloride salts are preferred.

Depending upon the conditions employed during the course of the reactions, the novel compounds are obtained either in the form of the bases or salts thereof. The salts are converted to the free bases by reaction with an alkali and in turn the bases can be converted to their therapeutically useful acid addition salts by reaction with an appropriate organic or inorganic acid.

The basic amides may be reduced to the corresponding octahydro-indolizinealkylamines which possess hypotensive and central nervous system depressant properties. The reduction may be carried out with any one of a variety of well-known reducing agents such as a complex metal hydride, i.e., sodium borohydride, potassium borohydride or, preferably, lithium aluminum hydride, in the presence of a solvent. Suitable solvents when a metal hydride is used are methanol, ethanol, 2-propanol and the like; whereas, if the reducing agent is lithium aluminum hydride, suitable solvents are an anhydrous ether, tetrahydrofuran, ethylene glycol or dimethyl ether.

The following examples are intended to illustrate, but not to limit, the scope of the present invention.

*Example I*

2-pyridinecarboxaldehyde (107 parts by weight), dimethyl malonate (145 parts by weight), piperidine (8 parts by volume) and benzoic acid (6.6 parts by weight) are heated in benzene for 2.5 hours with azeotropic distillation of water. The reaction solution is cooled, concentrated under reduced pressure, diluted with ether, washed with sodium bicarbonate solution and water and dried. Removal of the solvents under reduced pressure and trituration of the residue with aqueous methanol gives 180 parts by weight of white plates, melting point 82° C. to 84° C. One recrystallization from aqueous methanol gives white plates, dimethyl 2-pyridylmethylenemalonate, melting point 83.5° C. to 84.5° C.

*Example II*

The diethyl homolog is prepared by the same method as dimethyl 2-pyridylmethylenemalonate starting with diethyl malonate. The twice distilled orange-brown liquid (81% yield, boiling point 157°/0.5 mm.) solidifies on standing. A sample of the free base is converted to the sulfate salt and recrystallized twice from ethanol-ether to give white needles, diethyl 2-pyridylmethylenemalonate sulfate, melting point 100° C. to 101.5° C.

*Example III*

To an ethereal solution of phenylmagnesium bromide (prepared from 196 parts by weight of bromobenzene and 30 parts by weight of magnesium) a benzene solution of 125 parts by weight of dimethyl 2-pyridylmethylenemalonate is added dropwise over a period of one and one-half hours, at 0° C. to 5° C. The reaction solution is stirred for two hours at 5° C., then poured into cold, dilute hydrochloric acid. The aqueous layer is withdrawn and partially neutralized with solid potassium carbonate. The precipitated solid is filtered and air dried, amounting to 81 parts by weight of a tan solid, melting point 155° C. to 165° C. (dec.). Recrystallization from ethanol-ether gives a white solid, melting point 175° C. to 178° C. (dec.). This material is dimethyl phenyl-2-pyridylmethylmalonate hydrochloride. Neutralization of its aqueous solution affords the corresponding free base, subsequently described. The original filtrate of the hydrochloride salt is made basic with potassium carbonate and extracted with ether, then with methylene chloride. Drying of the organic layers over magnesium sulfate and concentration gives 20 parts by weight of a tan solid, melting point 95° C. to 97° C. Recrystallization from petroleum ether-ethyl acetate affords a white solid, dimethyl phenyl-2-pyridylmethylmalonate, melting point 97° C. to 98° C.

*Example IV*

The procedure used for the preparation of dimethyl phenyl-2-pyridylmethylmalonate is followed with the following amounts of materials: phenylmagnesium bromide from 70 parts by weight of bromobenzene and 10.7 parts by weight of magnesium and diethyl 2-pyridylmethylenemalonate (51 parts by weight). The product, isolated as the free base, amounts, after one recrystallization from petroleum ether, to 35 parts by weight of a white solid, melting point 71.5° C. to 72° C.

*Example V*

A 10.8 parts by weight sample of diethyl 2-pyridylmethylenemalonate is reduced over 0.8 part by weight of platinum oxide in 100 parts by volume of absolute ethanol and 4 parts by volume of glacial acetic acid under an initial pressure of 60 pounds/in.$^2$ of hydrogen. After seven hours, the theoretical amount of hydrogen has been consumed and the hydrogen uptake stops. The reaction solution is filtered and concentrated to dryness under reduced pressure using gentle heat. The concentrate, cooled in an ice bath, is made basic with 14 parts by volume of 35% sodium hydroxide and extracted with ether. The ether extracts are combined, washed with water, dried and concentrated to dryness under reduced pressure, giving 8.9 parts by weight of ethyl octahydro-3-oxo-2-indolizinecarboxylate as a yellow oil. After two distillations, 6.2 parts by weight of a pale yellow oil is obtained, boiling point 110–111°/0.06 mm.

*Example VI*

A 22.1 parts by weight sample of dimethyl 2-pyridylmethylenemalonate is reduced over 1.25 parts by weight of platinum oxide catalyst in a solution of 150 parts by volume of ethanol and 10 parts by volume of acetic acid. The initial pressure of hydrogen is 60 pounds/in.$^2$. After the theoretical amount of hydrogen is consumed, the catalyst is removed by filtration and the filtrate is concentrated to an oil which is distilled, giving 14.3 parts by weight of an oil, methyl octahydro-3-oxo-2-indolizinecarboxylate, boiling point 138–145°/1 mm.

*Example VII*

To an ethanolic solution of dimethyl phenyl-2-pyridylmethylmalonate (10 parts by weight) containing 10 parts by volume of glacial acetic acid, is added 1 part by weight of platinum oxide catalyst and the mixture is hydrogenated at room temperature at an initial pressure of 51 pounds/in.$^2$. After the theoretical amount of hydrogen has been absorbed (three hours), the reaction mixture is filtered. The filtrate is concentrated, diluted with ether, washed with aqueous sodium bicarbonate, dried and concentrated. Trituration of the oily residue in petroleum ether-ether gives 6.1 parts by weight of the product as a mixture of geometrical isomers. A recrystallization from petroleum ether-ethyl acetate gives white crystals of methyl octahydro-3-oxo-1-phenyl-2-indolizinecarboxylate, melting point 84° C. to 89° C.

A 0.330 part by weight sample of sharp-melting octahydro-3-oxo-1-phenyl-2-indolizinecarboxylic acid (melting point 166° C. to 167° C.) is dissolved in methanol and treated with diazomethane until the yellow color persists. The solution is then decolorized with a drop of acetic acid and concentrated. The residual semisolid is recrystallized from petroleum ether-ethyl acetate to give 0.235 part by weight of white prisms, methyl octahydro-3-oxo-1-phenyl-2-indolizinecarboxylate, melting point 113.5° C. to 114° C. The infrared spectrum of this material is very similar but not identical with the spectrum of the above-mentioned mixture of isomers.

*Example VIII*

A solution of 29.6 parts by weight of methyl octahydro-3-oxo-2-indolizinecarboxylate in 50 parts by volume of toluene is added dropwise over fifteen minutes to a suspension of sodium hydride (8.3 parts by weight of 54.7% sodium hydride in mineral oil is well washed with toluene to remove the mineral oil; the weight of active sodium hydride is assumed to be 4.5 parts by weight) in 250 parts by volume of toluene. After one hour refluxing, the gas evolution ceases and a solution of 25.3 parts by weight of benzyl chloride in 50 parts by volume of toluene is added dropwise to the stirred mixture at 100° C. The mixture is stirred at reflux for sixteen hours, cooled and carefully treated with 5 parts by volume of absolute ethanol, then 100 parts by volume of water. The organic layer is washed successively with 10% sodium hydroxide solution, water and dilute hydrochloric acid. The aqueous acidic layer, along with some additional concentrated hydrochloric acid, is added to the combined aqueous and basic solutions until the resulting pH is approximately 3. A solid, octahydro-3-oxo-2-benzyl-2-indolizinecarboxylic acid, separates, is collected by filtration, dried and found to weigh 6.3 parts by weight (15% of the theoretical amount of octahydro-3-oxo-2-benzyl-2-indolizinecarboxylic acid), melting point 170° C. (gas evolution). The organic layer from the acid extraction is washed with water and dried by azeotropic distillation, which is continued to remove all volatile material. The residual oil weighs 35.8 parts by weight. A sample of the oil, methyl octahydro-3-oxo-2-benzyl - 2 - indolizinecarboxylate, is distilled, boiling point 160°/0.2 mm.

*Example IX*

To an aqueous methanolic solution of methyl octahydro-3-oxo-1-phenyl-2-indolizinecarboxylate (35 parts by weight) is added 5 parts by weight of sodium hydroxide and the resulting solution is refluxed for three hours. It is then concentrated, diluted with water and extracted with ether. The aqueous layer is made acidic with concentrated hydrochloric acid and extracted with methylene chloride. After drying, the solvent is removed under reduced pressure leaving 29.3 parts by weight of the crystalline product. A recrystallization from ethyl acetate gives the pure product as a mixture of geometrical isomers, octahydro-3-oxo-1-phenyl-2-indolizinecarboxylic acid, melting point 149° C. to 153° C.

A portion of this mixture is recrystallized several times from ethyl acetate and gives a single, sharp-melting isomeric acid as small white prisms, melting point 166° C. to 167° C. The infrared spectrum of this material, although very similar, is not identical with the spectrum of the mixture of isomers.

*Example X*

In a similar manner ethyl octahydro-3-oxo-2-indolizinecarboxylate is hydrolyzed to give a 72% crude yield of acid which after one recrystallization from ether-methylene chloride melts at 110° C. to 121° C. Two recrystallizations from the same solvent mixture give a small yield of crystals, octahydro-3-oxo-2-indolizinecarboxylic acid, melting sharply at 123° C. to 124.5° C.

*Example XI*

A mixture of 23 parts by weight of methyl octahydro-3-oxo-2-benzyl-2-indolizinecarboxylate, 40 parts by volume of 95% ethanol and 50 parts by volume of 10% aqueous sodium hydroxide is refluxed for five hours. A cloudiness is removed by filtration and the filtrate is concentrated under reduced pressure almost to dryness. The slurry is dissolved in 125 parts by volume of water, the solution is extracted with ether, and the cooled aqueous layer is made strongly acidic with concentrated hydrochloric acid. The cream colored solid which is collected by filtration is thoroughly dried over phosphorous pentoxide to give 16.9 parts by weight, melting point 175° C. (gas evolution), of octahydro-3-oxo-2-benzyl-2-indolizinecarboxylic acid. A sample is recrystallized twice from ethyl acetate and is found to melt at 177° C. (gas evolution).

*Example XII*

Methyl octahydro - 3-oxo-1-phenyl-2-indolizinecarboxylate (10.6 parts by weight) is reduced with 6.9 parts by weight of lithium aluminum hydride by the procedure described in Example XIII. A 4.7 parts by weight sample of the resulting yellow oil (total yield 8.5 parts by weight) is treated with 1.2 parts by weight of fumaric acid in methanol. The resulting solid is recrystallized several times from isopropyl alcohol-ether to give a white solid, octahydro - 1 - phenyl-2-indolizinemethanol fumarate, melting point 173° C. to 175° C. (dec.).

*Example XIII*

To an ether suspension of lithium aluminum hydride (8.2 parts by weight) is added an ethereal solution of ethyl octahydro - 3-oxo-1-phenyl-2-indolizinecarboxylate, 13.2 parts by weight, over a period of one-half hour. The mixture is refluxed for three and one-half hours, cooled and 24.5 parts by volume of water added cautiously. The solids are removed by filtration and the filtrate, after drying over magnesium sulfate, is concentrated to leave 8.5 parts by weight of a slightly yellow oil. An ether solution of this oil is allowed to react for fifty hours with methyl iodide (5 parts by weight). The precipitated solid amounts to 7.3 parts by weight. It is recrystallized repeatedly from ethanol to afford two fractions. Fraction (a) amounts to 4.1 parts by weight of a mixture of isomers of octahydro-1-phenyl-2-indolizinemethanol methiodide, melting point 218.5° C. to 219.5° C.

Fraction (b) amounts to 0.8 part by weight of a single isomer of octahydro-1-phenyl-2-indolizinemethanol methiodide, melting point 184° C. to 186° C., whose infrared spectrum is similar to that of fraction (a).

*Example XIV*

A solution of 14.4 parts by weight of methyl octahydro-3-oxo-2-benzyl-2-indolizinecarboxylate in 50 parts by volume of ether is added dropwise to a suspension of 5.7 parts by weight of lithium aluminum hydride in 200 parts by volume of ether. The stirred mixture is refluxed overnight, then cooled and decomposed by the careful addition of 17 parts by volume of water. The inorganic solids are removed by filtration and the organic solution is washed with water, dried and evaporated under reduced pressure to give 9.4 parts by weight (77% of theory) of oil. A sample of the oil is converted to its hydrochloride salt which is recrystallized twice from 2-propanol to give white platelets, octahydro-2-benzyl-2-indolizinemethanol hydrochloride, melting point 235° C. to 237° C.

*Example XV*

To 0.2 part by weight of dry sodium methoxide and 6.8 parts by weight of octahydro-2-indolizinemethanol suspended in 700 parts by volume of n-heptane is added 10.6 parts by weight of ethyl benzilate. The mixture is refluxed for one hour and then 475 parts by volume of liquid is removed by distillation. Ether, 150 parts by volume, is added to the remaining residue and the resulting solution is extracted with dilute hydrochloric acid. Basification of the aqueous acid layer, extraction with ether, and evaporation of the ether layer to dryness give 9.6 parts by weight of solid, melting point 98° C. to 102° C. Two recrystallizations from heptane give 6.8 parts by weight of crystals, octahydro-2-indolizinemethyl benzilate, melting point 104° C. to 106° C.

*Example XVI*

The procedure for the preparation of octahydro-2-indolizinemethyl benzilate is employed with 9 parts by weight of octahydro-1-phenyl-2-indolizinemethanol and 9.5 parts by weight of ethyl benzilate. Trituration of the crude product in hexane-ether gives 11.3 parts by weight of a white solid, melting point 102° C. to 105° C. A recrystallization from hexane gives a white solid, octahydro-1-phenyl-2-indolizinemethyl benzilate, melting point 108° C. to 109° C.

*Example XVII*

A 7.2 parts by weight sample of octahydro-3-oxo-2-indolizinecarboxylic acid and 1.6 parts by weight of sodium hydroxide in 50 parts by volume of water-ethanol solution (3:2) is evaporated to a gum and dried under high vacuum at 60° C. A benzene solution of β-dimethylaminoethyl chloride (from trituration of 9.2 parts by weight of the hydrochloride salt with sodium hydroxide pellets) is added to the dry sodium carboxylate suspended in 50 parts by volume of benzene. The mixture is refluxed for twenty-four hours, cooled and 1.7 parts by weight of sodium chloride removed by filtration. The filtrate is evaporated to give 8.8 parts by weight of oil which is distilled. The light yellow oily distillate (7.3 parts by weight) boils at 155°/0.35 mm. The oily base is converted to the fumarate salt and recrystallized successively from 2-propanol-ether and 95% ethanol-ether to give white crystals of 2-dimethylaminoethyl octahydro-3-oxo-2-indolizinecarboxylate fumarate, melting point 113° C. to 115° C.

*Example XVIII*

Sodium octahydro - 3 - oxo - 1 - phenyl-2-indolizine-carboxylate, prepared from 6.8 parts by weight of the corresponding acid (octahydro-3-oxo-1-phenyl-2-indolizinecarboxylic acid) and 1.05 parts by weight of sodium hydroxide, is suspended in dry benzene and a benzene solution of dimethylaminoethyl chloride (from 7.5 parts by weight of the corresponding hydrochloride and 3.5 parts by weight of solid sodium hydroxide) is added to the mixture, which is refluxed for twenty-five hours, then allowed to stir at room temperature for several days. The reaction mixture is filtered, the filtrate is extracted with dilute hydrochloric acid, the aqueous layer made basic with solid potassium carbonate and extracted with methylene chloride. After drying, the solvent is removed leaving 6.1 parts by weight of a brown oil. The compound is then boiled in methanol, with fumaric acid, for three hours, concentrated and the residue crystallized from isopropyl alcohol-ether giving 1.65 parts by weight of a white solid, 2-dimethylaminoethyl octahydro-3-oxo-1-phenyl-2-indolizinecarboxylate fumarate, melting point 150° C. to 160° C. Several recrystallizations from isopropyl alcohol-ether raises the melting point to 161° C. to 163° C.

*Example XIX*

To a benzene solution of octahydro-3-oxo-1-phenyl-2-indolizinecarboxylic acid chloride, prepared from 6.5 parts by weight of the sodium salt of the corresponding acid and 2.9 parts by weight of oxalyl chloride according to the procedure of G. I. Poos et al. [J. Orig. Chem., 26, 4898 (1961)] is added dropwise a solution of 1-methyl-4-hydroxypiperidine (3 parts by weight) in benzene. The resulting mixture is stirred at room temperature for one hour then poured into cold dilute hydrochloric acid and washed with ether. The acidic layer is made basic with potassium carbonate and extracted with ether. The ether solution is dried and concentrated. The residual oil forms a fumarate salt which after three recrystallizations from ethanol-ether gives a white solid, (1-methyl-4 - piperidyl)octahydro-3-oxo-1-phenyl - 2 - indolizinecarboxylate fumarate, melting point 174° C. to 176° C.

*Example XX*

A 16.8 parts by weight sample of ethyl octahydro-3-oxo-2-indolizinecarboxylate is added to a solution of 1.08 parts by weight of sodium methoxide in 165 parts by volume of methanol. A 14.6 parts by weight sample of 4-phenylpiperazine is then added and the solution is refluxed for twenty-eight hours. After addition of 0.5 part by volume of water, the solvents are removed by evaporation under reduced pressure to give a white solid. Recrystallization from benzene- petroleum ether (30° C. to 60° C.) gives 15.5 parts by weight of a white solid, octahydro-3-oxo-2-(4 - phenyl - 1 - piperazinylcarbonyl) indolizine, melting point 153° C. to 157° C. One recrystallization from ethyl acetate (Norite) gives white nacreous plates, melting point 162° C. to 164° C.

*Example XXI*

A 16.8 parts by weight sample of ethyl octahydro-3-oxo-2-indolizinecarboxylate is added to a solution of 1.08 parts by weight of sodium methoxide in 40 parts by volume of methanol. A 14.0 parts by weight sample of freshly distilled β-dimethylaminoethylamine is then added and the solution is refluxed for two hours. After sitting overnight, 0.5 part by volume of water is added and the solvents removed by evaporation under reduced pressure to give an oil which is distilled. The fraction boiling at 174°/0.35 mm., octahydro-3-oxo-2-[(2-dimethylaminoethyl)carbamoyl]indolizine, weighs 9.5 parts by weight. The oily base is converted to its hydrochloride salt and the salt, after two recrystallizations from 2-propanol-ether solution, gives white nacreous plates, melting point 174° C. to 176° C.

*Example XXII*

To a solution of sodium methoxide prepared from 0.57 part by weight of sodium in 50 parts by volume of methanol is added a solution of methyl octahydro-3-oxo-2-indolizinecarboxylate (19.7 parts by weight) in 50 parts by volume of methanol followed by the addition of d-amphetamine (15.0 parts by weight) in 50 parts by volume of methanol. The solution is refluxed for twenty hours, then the methanol is removed under reduced pressure. The oil is distilled twice to give octahydro-3-oxo-2-[N-(α-methylphenethyl)carbamoyl]indolizine, boiling point 185–192°/0.075 mm.

*Example XXIII*

A benzene solution of octahydro-3-oxo-2-indolizinecarboxylic acid chloride is prepared from 8.1 parts by weight of the corresponding acid (octahydro-3-oxo-2-indolizinecarboxylic acid) via the anhydrous sodium salt and 5.6 parts by weight of oxalyl chloride according to the procedure of G. I. Poos et al. [J. Org. Chem., 26, 4898 (1961)]. To this solution is added dropwise over twenty-five minutes a solution of 5.2 parts by weight of 3-aminomethylpyridine. A solid begins to separate; 5 parts by volume of triethylamine is added. The mixture is stirred overnight at room temperature then filtered from 8.4 parts by weight of insoluble salts. The filtrate is washed with water, dried and evaporated under reduced pressure to give 2.4 parts by weight of oil. The aqueous washings are combined and made basic (pH 14) with 35% sodium hydroxide solution. The mixture is extracted with benzene and the organic layer is dried and evaporated under reduced pressure to give 7.8 parts by weight of oil. The combined oils are chromatographed on a column packed with neutral Woelm alumina. The column is eluted with benzene, ether, and ether-ethanol. The fraction collected from the ether-ethanol (1:1) eluate is evaporated to give 7.6 parts by weight of semisolid which is recrystallized from ether to give 5.5 parts by weight of white crystals, octahydro-3-oxo-2-[N-(3-pyridylmethyl)carbamoyl]indolizine, melting point 114° C. to 117° C. Successive recrystallizations from ethyl acetate-hexane and ethyl acetate-ether give white crystals, melting point 115° C. to 116.5° C.

*Example XXIV*

To a benzene solution of octahydro-3-oxo-1-phenyl-2-indolizinecarboxylic acid chloride, prepared from 8 parts by weight of the sodium salt of the corresponding acid and 3.58 parts by weight of oxalyl chloride is added dropwise a solution of pyrrolidine (3.98 parts by weight) in benzene. The resulting reaction solution is stirred at room temperature for two hours, washed with dilute hydrochloric acid, dried and concentrated. The residual yellow solid is recrystallized from ethyl acetate to give 6.6 parts by weight of white needles, octahydro-3-oxo-1-phenyl - 2 - (1 - pyrrolidinylcarbonyl)indolizine, melting point 169° C. to 170° C.

*Example XXV*

The procedure described for the preparation of octahydro - 3 - oxo - 1 - phenyl - 2 - (1 - pyrrolidinylcarbonyl) indolizine is employed with 5.1 parts by weight of sodium octahydro-3-oxo-1-phenyl-2-indolizinecarboxylate, 2.57 parts by weight of oxalyl chloride and 5 parts by weight of 1-phenylpiperazine. The crude product which amounts to 5.4 parts by weight is recrystallized from ethyl acetate to give a white solid, octahydro-3-oxo-1-phenyl-2-(4-phenyl-1-piperazinylcarbonyl)indolizine, melting point 164° C. to 165° C.

Example XXVI

The procedure described for the preparation of octahydro - 3 - oxo - 1 - phenyl - 2 - (1 - pyrrolidinylcarbonyl) indolizine is employed with 14 parts by weight of sodium octahydro - 3 - oxo - 1 - phenyl - 2 - indolizinecarboxylate, 6.3 parts by weight of oxalyl chloride and 9 parts by weight of morpholine. The crude product, which amounts to 15.2 parts by weight, is recrystallized twice from ethyl acetate to give small white prisms, octahydro-3-oxo-1-phenyl-2-morpholinocarbonylindolizine, melting point 128° C. to 129° C.

Example XXVII

The procedure described for the preparation of octahydro - 3 - oxo - 1 - phenyl - 2 - (1 - pyrrolidinylcarbonyl) indolizine is employed with 6.6 parts by weight of sodium octahydro - 3 - oxo - 1 - phenyl - 2 - indolizinecarboxylate, 2.9 parts by weight of oxalyl chloride and 3.2 parts by weight of 1-piperazineethanol. The crude product is refluxed in 5% aqueous methanolic sodium hydroxide for fifteen minutes to remove, by hydrolysis, the amino ester which forms as a by-product. The base insoluble portion amounts to 2.2 parts by weight which on recrystallization from ethyl acetate gives white crystals, octahydro-3-oxo-1 - phenyl - 2 - [4 - (2 - hydroxyethyl) - 1 - piperazinylcarbonyl]indolizine, melting point 179° C. to 180° C.

Example XXVIII

A benzene solution of 6.6 parts by weight of octahydro - 3 - oxo - 1 - phenyl - 2 - (1 - pyrrolidinylcarbonyl) indolizine is added dropwise to a stirred lithium aluminum hydride suspension (4.1 parts by weight) in ether and the resulting mixture is refluxed for three hours. The mixture is then decomposed with 12 parts by volume of water, filtered, and the filtrate, after drying, concentrated. Saturation of an ethereal solution of the oily residue with dry hydrogen chloride gives a hygroscopic solid. After several recrystallizations from ethanol-ether, crystals of the dihydrochloride, octahydro-1-phenyl-2-(1-pyrrolidinylmethyl)indolizine dihydrochloride, melting point 245.5° C. to 247° C., are obtained.

Example XXIX

The procedure described for the preparation of octahydro - 1 - phenyl - 2 - (1 - pyrrolidinylmethyl)indolizine dihydrochloride is employed with 1.8 parts by weight of octahydro - 3 - oxo - 1 - phenyl - 2 - morpholinocarbonyl-indolizine and 1.2 parts by weight of lithium aluminum hydride in ether. The product is isolated as the dihydrochloride salt, octahydro-1-phenyl-2-morpholinomethyl-indolizine dihydrochloride, melting point 270° C. to 272° C. (dec.).

Example XXX

A 70.6 parts by weight sample of octahydro-3-oxo-2-benzyl-2-indolizinecarboxylic acid in an Erlenmeyer flask is heated on the hot plate until it melts and then for an additional ten minutes until no more gas is evolved. The oil is dissolved in ether-benzene and extracted with sodium bicarbonate solution. The organic solution is washed with water, dried and evaporated under reduced pressure to an oil, 49.5 parts by weight. A sample of the oil is distilled twice to give a pale yellow oil, octahydro-3-oxo-2-benzylindolizine, boiling at 138°/0.175 mm.

Example XXXI

A solution of 15 parts by weight of octahydro-3-oxo-2-benzylindolizine in 75 parts by volume of ether is added dropwise over fifteen minutes to a suspension of 7.4 parts by weight of lithium aluminum hydride in 150 parts by volume of ether. The stirred mixture is refluxed overnight, then cooled and decomposed by the careful addition of 23 parts by volume of water. The inorganic solids are removed by filtration and the organic solution is washed with water, dried and concentrated to dryness under reduced pressure to give 14 parts by weight of oil. This oil upon sitting at room temperature for six days in a stoppered flask deposits a viscous brown oil whose infrared spectrum suggests a carbonate salt has formed. The pale yellow-tan supernatant is distilled to give 9.7 parts by weight of colorless oil boiling at 97–100°/0.15 mm. A sample of the oily base is converted to the hexamate salt which is recrystallized from acetone-ether solution to give white crystals, octahydro-2-benzylindolizine hexamate, melting point 108° C. to 120° C.

Example XXXII

A 4.5 parts by weight sample of octahydro-3-oxo-2-benzyl-2-indolizinecarboxylic acid is added portionwise over twenty minutes to 66 parts by weight of polyphosphoric acid heated to 100° C. After three hours heating and stirring at 100° C. the slurry is cooled and poured onto crushed ice. After the ice melts, the aqueous solution is extracted several times with ether-benzene and the combined organic layer is washed with water, dried, and evaporated under reduced pressure to 4 parts by weight of oil which crystallizes, melting point 113° C. to 117° C. One recrystallization from cyclohexane gives 2.8 parts by weight of crystals, melting point 119° C. to 121° C. A sample, 1',5',6',7',8',8a'-hexahydro-1-oxospiro(indan-2,2'-indolizin)-3'(2'H)-one, is recrystallized to constant melting point, 121° C. to 122° C.

Example XXXIII

A suspension of 7.7 parts by weight of 1',5',6',7',8',8a'-hexahydro-1-oxospiro(indan-2,2'-indolizin)3'(2'H)-one in 600 parts by volume of ether is added rapidly to a suspension of 3.4 parts by weight of lithium aluminum hydride in 30 parts by volume of ether with cooling. The mixture is stirred at reflux for twenty hours, cooled, and cautiously treated with 10.4 parts by volume of water. After removal of the inorganic solids by filtration the filtrate is extracted with 10% sodium hydroxide solution, washed with water, dried, and evaporated to 5.6 parts by weight of oil which crystallizes, melting point 107° C. to 117° C. Two recrystallizations from benzene-hexane give 3 parts by weight of white crystals, octahydro-1-hydroxyspiro(indan-2,2'-indolizine), melting point 110° C. to 122° C.

Example XXXIV

A 5.1 parts by weight sample of 1',5',6',7',8',8a'-hexahydro-1-oxospiro(indan-2,2'-indolizin)-3'(2'H)-one in 50 parts by volume of 2-propanol is added rapidly to a suspension of 0.76 part by weight of sodium borohydride in 125 parts by volume of 2-propanol at room temperature. The mixture is stirred at reflux for two hours then cooled in an ice bath and treated with 125 parts by volume of 2.9 M hydrochloric acid. The 2-propanol is removed under reduced pressure and the mixture is extracted several times with ether-benzene solution. The combined organic solution is washed with water, dried, and evaporated under reduced pressure to 3.8 parts by weight of an oil, which partially crystallizes on standing. The aqueous acid layer is made basic with 35% sodium hydroxide solution and extracted with methylene chloride. The organic layer is washed with water, dried and evaporated under reduced pressure to an oil (0.6 part by weight). The combined oil is crystallized from benzene-hexane solution to give 3.3 parts by weight of white crystals, melting point 116° C. to 128° C. One recrystallization from cyclohexane-hexane solution followed by two recrystallizations from cyclohexane gives 2.4 parts by weight of white crystals of mixed crystalline form of 1',5',6',7',8',8a'-hexahydro-1-hydroxy-spiro(indan-2,2'-indolizine)-3'(2'H)-one, clusters of feathery needles, melting point 137° C. to 142° C. and larger irregular prisms, melting point 151° C. to 155° C.

The mother liquor from the recrystallization of the mixture of stereoisomers is concentrated and the resulting solid is recrystallized twice from cyclohexane to give 0.200 part by weight of a single isomer as white irregular prisms, 1',5',6',7',8',8a'-hexahydro-1 - hydroxyspiro(indan - 2,2'-indolizin)-3'(2'H)-one, melting point 154° C. to 156° C. A mixed melting point with the isomeric mixture is depressed.

*Example XXXV*

Using the procedure of Example XXI and replacing ethyl octahydro-3-oxo-2 - indolizinecarboxylate with an equivalent amount of methyl octahydro-3-oxo-1-phenyl-2-indolizinecarboxylate, the product obtained is octahydro-3-oxo-1-phenyl-2-[N-(2 - dimethylaminoethyl)carbamoyl] indolizine.

*Example XXXVI*

Using the procedure of Example XXII and replacing methyl octahydro-3-oxo-2-indolizinecarboxylate with an equivalent amount of methyl octahydro-3-oxo-1-phenyl-2-indolizinecarboxylate, the product obtained is octahydro-3-oxo-1-phenyl-2-[N - (α - methylphenethyl)carbamoyl] indolizine.

*Example XXXVII*

Using the procedure of Example XXIII and replacing octahydro-3-oxo-2 - indolizine - carboxylic acid with an equivalent amount of octahydro-3-oxo-1-phenyl-2-indolizine-carboxylic acid, the product obtained is octahydro-3-oxo-1-phenyl-2-[N-(3 - pyridylmethyl)carbamoyl]indolizine.

*Example XXXVIII*

Using the procedure of Example XXIII and replacing 3 - aminomethylpyridine with equivalent amounts of 2-aminomethylpyridine and 4 - aminomethylpyridine, the products obtained are octahydro-3-oxo-2-[N-(2-pyridylmethyl)carbamoyl]indolizine and octahydro-3-oxo-2-[N-(4-pyridylmethyl)carbamoyl]indolizine.

*Example XXXIX*

Using the procedure of Example XXIII and replacing octahydro-3-oxo - 2 - indolizine-carboxylic acid with an equivalent amount of octahydro-3-oxo-1-phenyl-2-indolizine-carboxylic acid and further replacing 3-aminomethylpyridine with equivalent amounts of 2-aminomethylpyridine and 4-aminomethylpyridine, the products obtained are octahydro-3-oxo-1-phenyl-2-[N - (2 - pyridylmethyl)carbamoyl]indolizine and octahydro-3-oxo-1-phenyl-2-[N-(4-pyridylmethyl)carbamoyl]indolizine.

What is claimed is:
1. A member selected from the group consisting of a compound of the formula

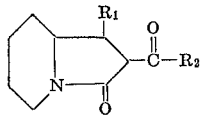

wherein $R_1$ is a member selected from the group consisting of hydrogen and phenyl; and $R_2$ is a member selected from the group consisting of —NH—Alk—N(Alk)$_2$, —NH—Alk—phenyl and —NH—Alk—pyridyl, wherein Alk is lower alkyl.

2. Octahydro-3-oxo-2-[N-(2 - dimethylaminoethyl)carbamoyl]indolizine hydrochloride.

3. Octahydro-3-oxo-2-[N - (α - methylphenethyl)carbamoyl]indolizine.

4. Octahydro-3-oxo-2-[N-(3-pyridylmethyl)carbamoyl]indolizine.

5. Octahydro-3-oxo-1-phenyl-2-[N-(2 - dimethylaminoethyl)carbamoyl]indolizine.

6. Octahydro-3-oxo-1-phenyl-2-[N-(α-methylphenethyl)carbamoyl]indolizine.

7. Octahydro-3-oxo-1-phenyl-2-[N-(3 - pyridylmethyl)carbamoyl]indolizine.

8. Octahydro-3-oxo-2-[N-(2-pyridylmethyl)carbamoyl]indolizine.

9. Octahydro-3-oxo-2-[N-(4-pyridylmethyl)carbamoyl]indolizine.

10. Octahydro-3-oxo-1-phenyl-2-[N-(2 - pyridylmethyl)carbamoyl]indolizine.

11. Octahydro-3-oxo-1-phenyl-2-[N-(4-pyridylmethyl)carbamoyl]indolizine.

No references cited.

HENRY R. JILES, *Acting Primary Examiner.*

JOSE TOVAR, *Assistant Examiner.*

UNITED STATES PATENT OFFICE
CERTIFICATE OF CORRECTION

Patent No. 3,268,540　　　　　　　　　　　　　　August 23, 1966

Richard J. Mohrbacher

It is hereby certified that error appears in the above numbered patent requiring correction and that the said Letters Patent should read as corrected below.

Column 1, line 51, for "product" read -- produce --; column 7, line 40, for "J. Orig. Chem.," read -- J. Org. Chem., --; column 10, line 37, for "30" read -- 300 --.

Signed and sealed this 22nd day of August 1967.

(SEAL)
Attest:

ERNEST W. SWIDER
Attesting Officer

EDWARD J. BRENNER
Commissioner of Patents